Patented Aug. 15, 1950

2,518,494

UNITED STATES PATENT OFFICE 2,518,494

MODIFIED NATURAL RESIN ESTER COPOLYMERS AND PROCESS OF MAKING SAME

John B. Rust, Montclair, N. J., assignor, by direct and mesne assignments, of one-half to Montclair Research Corporation, a corporation of New Jersey, and one-half to Ellis-Foster Company, a corporation of New Jersey No Drawing. Application March 15, 1946,
Serial No. 654,794

14 Claims. (Cl. 260—26)

This invention relates to modified copolymers of natural resin esters such as rosin or copal esters and to the process for the preparation of the same. More particularly it relates to addition or copolymerization products obtained by reacting: (a) Natural resin acid ester compositions comprising a polyhydric alcohol esterified with natural resin acids and a polycarboxylic acid monoester of a beta-unsaturated monohydric alcohol containing from 3 to 4 carbon atoms and (b) polymerizable compounds containing 1 or more $>C=CH_2$ groups.

It is an object of this invention to provide resinous compositions comprising modified natural resin acid esters, wherein the principal constituent is a highly unsaturated polymerizable ester consisting of a polyhydric alcohol esterified with a monoalkenyl ester of a polycarboxylic acid and an unsaturated resinous acid such as abietic acid or the unsaturated acids derived from rosin, copals, and other natural resins, which are heat advancing and which may be converted into insoluble, infusible masses by the application of heat.

It is a further object of this invention to provide a copolymer which is soluble in drying oils and which may be oil-reactive.

It is a still further object of this invention to provide modified rosin esters which may be heated with phenolic resins, alkyd resins, natural resins, and the like to secure various types of resins which when cooked with drying oils give fast drying, non-yellowing coating compositions.

Other objects of this invention will become apparent from the following description:

There is disclosed in my copending applications Serial No. 531,117, filed April 14, 1944, now Patent No. 2,398,668, April 16, 1946, and Serial No. 534,531, filed May 6, 1944, now Patent No. 2,398,669, April 16, 1946, (entitled "Modified Rosin Esters and the Process of Making Same") of which the present application is a continuation in part, modified rosin esters consisting of a polyhydric alcohol esterified with a monoalkenyl ester of a polycarboxylic acid and rosin.

Unsaturated polymerizable esters, having the highly unsaturated monoalkenyl ester of a polycarboxylic acid attached directly to the polyhydric alcohol in addition to the unsaturated natural resin acid may be represented by the general formula $$R_{n-x}—P—(DA)_x$$

where R is the acid radical of a natural resin, P is the radical of a polyhydric alcohol $P(OH)_n$, D is a dicarboxylic acid radical, A is the radical of a beta-unsaturated monohydric alcohol of 3 to 4 carbon atoms and $x$ is a positive number less than $n$. They are formed by esterifying the polyhydric alcohol with sufficient natural resin acid and dicarboxylic acid monoester to react with all the hydroxyl groups of the polyhydric alcohol. While the essential ester is of the type represented, the proportions of reactants may be such as to form a simple natural resin-polyhydric alcohol ester along with the unsaturated ester. These unsaturated esters are readily capable of combining with polymerizable unsaturated compounds of the type.

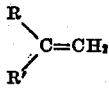

thus providing oil-soluble resins which are exceedingly high melting. Such a combination may take place through the unsaturated groups of the ester with the unsaturated group of the $>C=CH_2$ compound, thus giving products most useful to the art.

The products of this invention are prepared by heating together in a suitable reactor a highly unsaturated polymerizable ester (a polyhydric alcohol esterified with a monoalkenyl ester of a polycarboxylic acid and an unsaturated resin acid such as rosin) and a polymerizable compound having at least one $>C=CH_2$ group, at 150–250° C. under reflux until there is substantially no condensation of vapors, thus indicating completeness of reaction. Also, in practice it is at times useful to employ a peroxide catalyst such as benzoyl peroxide and the like to facilitate the rate of addition.

The products of this invention are light-colored, hard, brittle resins which possess high softening points and low acid numbers. The proportion of $>C=CH_2$ compound to unsaturated resin ester being preferably in a range of 5% to 60% depending upon the properties desired, although between 10% and 25% of the $>C=CH_2$ compound is generally preferred. These resins are compatible with and may be blended with drying oils, cellulose esters, phenolic resins, urea resins, melamine resins, polystyrene, polyacrylic acid esters, polymethacrylic acid esters, and the like, thus giving products particularly adapted to drying oil varnish formulations, nitrocellulose lacquer formulations, moldings, laminated products, and the like.

Numerous formulations of the unsaturated, polymerizable ester may be employed in the invention. In my copending patent applications, I have disclosed and claimed a number of polyhydric alcohols, resin acids, and also a number of dicarboxylic acid monoesters of unsaturated monohydric alcohols containing 3 to 4 carbon atoms. Thus, as starting materials I contemplate the following constituents of unsaturated resinous esters wherein these materials are so reacted as to give the desired unsaturated polymerizable ester.

Thus, as polyhydric alcohols, I may use pentaerythritol, polypentaerythritol, glycerol, polyglycerols, ethylene glycol, polyethylene glycols, dihydroxy ethoxy benzene, sorbitol, mannitol and the like.

As resin acids, I may use rosin, abietic acid, and resin acids from the saponification of copals and other natural resins.

Among the monoalkenyl esters of polycarboxylic acids, I may use monoallyl maleate, monoallyl itaconate, monoallyl citraconate, monoallyl phthalate, monoallyl fumarate, monoallyl succinate, monoallyl sebacate, monoallyl adipate, and the like. In place of allyl alcohol I may also use methallyl alcohol, crotyl alcohol, methyl vinyl carbinol and the like.

Diels-Alder products of conjugated dienes such as cyclopentadiene, isoprene, butadiene, and the like, with unsaturated dicarboxylic acids such as maleic anhydride, fumaric acid and the like may be used as the polycarboxylic acid in the formation of the heretofore mentioned monoalkenyl esters.

The compounds above listed are presentative of those which may be used in the process of the present invention and should not be construed as being limiting since numerous other polyhydric alcohols, unsaturated monohydric alcohols, polycarboxylic acids, and unsaturated resin acids may be employed in carrying out the teachings of this invention by those skilled in the art.

The unsaturated resin esters heretofore described may be combined with a number of unsaturated compounds which are capable of being polymerized and which may be represented by the general formula $CH_2=CR-R'$, where R represents hydrogen or a methyl group and R' is a negative radical such as aryl, acyl, carbalkoxy, acyloxy, acyloxymethyl, halogen carboxyl, hydroxyl and the like. Among such typical derivatives may be used vinyl acetate, acrylic acid esters of saturated monohydric alcohols, styrene, ethylene glycol ester of monoallyl maleate, diethylene glycol ester of monoallyl maleate, saturated monohydric alcohol esters of monoallyl maleate, saturated monohydric alcohol esters of monoallyl fumarate, glycerol ester of monoallyl maleate, pentaerythritol ester of monoallyl maleate, polyhydric alcohol esters of monoallyl phthalate, polyhydric alcohol esters of monoallyl sebacate, diallyl maleate, diallyl phthalate, diallyl sebacate, dihydroxy ethyl ether of hydroquinone (monoallyl maleate ester), etc.

The following examples are given in the way of illustration only and should not be limited, as numerous deviations are possible within the scope of the invention.

*Example 1.*—1500 parts of WW rosin and 193.2 parts of glycerol are heated together in a 3-liter, 3-neck flask equipped with a stirrer, thermometer and air condenser at 200–240° C. for 6 hours. 156 parts of monoallyl maleate are added and heating continued at 200–220° C. until all of the water of reaction is eliminated. A hard, brittle, light-colored resin is secured which possesses an acid number of 26.9 and a ring and ball softening point of 98° C. (Softening point of ester gum=89° C.) The proportions of reactants used in making this ester composition are approximately 2 moles of glycerol with 5 moles of rosin and 1 mole of monoallyl maleate.

30 parts of the above resin and 60 parts of bodied linseed oil are heated together rapidly to 300° C., and the temperature held at 290–300° C. for 28 minutes until the resulting varnish base could be drawn into a string 18″–24″ in length. It is thinned with 90 parts of VM and P naphtha, and 0.6% lead as lead naphthenate and 0.06% cobalt as cobalt naphthenate added based on the oil. The varnish air-dried to a tack-free film in 5¼ hours. After 24 hours, the dried varnish film possessed a Sward rocker hardness of 39. The dried film softened slightly in tap water during 24 hours.

A. 90 parts of the resin of Example 1 and 10 parts of styrene are heated together in a 3-neck flask equipped with a stirrer, thermometer, and water cooled condenser to 200° C. The temperature is then increased to 250° C. over a period of 6 hours. All condensation of monomeric styrene had ceased. An exceedingly light-colored resin is obtained which possesses an acid number of 19.2 and a ring and ball softening point of 114° C.

30 parts of the above resin and 60 parts of bodied linseed oil are heated together rapidly to 300° C. and the temperature held at 290–300° C. for 18 minutes. The resulting varnish base could be drawn into a string 18″–24″ in length. It is thinned with 90 parts of VM and P naphtha, and 0.6% lead as lead naphthenate and 0.06% cobalt as cobalt naphthenate added based on the oil. The varnish air-dried to a tack-free film in 4½ hours. After 24 hours, the dried varnish film possessed a Sward rocker hardness of 47. The dried film softened slightly in tap water during 24 hours.

B. 90 parts of the resin of Example 1 and 10 parts of distilled vinyl acetate are heated together in 3-neck flask equipped with a stirrer, thermometer, and water condenser to 200° C. and held at this temperature for 17 hours. There is no further condensation of monomeric vinyl acetate. A light-colored resin is secured which possesses an acid number of 21 and a ring and ball softening point of 103° C.

C. 120 parts of the resin of Example 1 and 40 parts of styrene are heated together in a 3-neck flask equipped with a stirrer, thermometer, and water cooled condenser to 200° C. The temperature is then increased to 250° C. over a period of 6½ hours. All condensation of monomeric styrene had ceased. An exceedingly light-colored resin is formed which possesses an acid number of 12 and a softening point of 120° C. (ring and ball).

D. 135 parts of the resin of Example 1 and 15 parts of ethyl acrylate are heated together in a 3-neck flask equipped with a stirrer, thermometer, and water-cooled condenser to 200° C. The temperature is then increased to 220–230° C. over a period of 12 hours. All condensation of monomeric ethyl acrylate had ceased. A light-colored resin is produced which possesses an acid number of 21.5 and a ring and ball softening point of 113° C.

30 parts of the above resin and 60 parts of bodied linseed oil are heated together rapidly to 300° C. and held at 290–300° C. for 20 minutes. The varnish base could be drawn into a string 18″–24″ in length. It is thinned with 90 parts of VM and P naphtha, and 0.6% lead as lead naphthenate and 0.06 cobalt as cobalt naphthenate added on the oil. The varnish air-dried to a tack-free film in 5 hours. After 24 hours, the dried varnish film possessed a Sward rocker hardness of 43. The dried film softened slightly in tap water after 24 hours.

E. 122.5 parts of the resin of Example 1, and 22.5 parts of diallyl maleate are heated together in a 3-neck flask equipped with a stirrer, thermometer, and air-condenser to 200° C. The temperature is slowly raised to 250° C. and held for 8½ hours. A light-colored, clear resin forms which possesses an acid number of 19 and a ring and ball softening point of 118° C.

Example 2.—1000 parts of WW rosin and 145 parts of technical grade pentaerythritol are heated together in a 3-liter, 3-neck flask equipped with a stirrer, thermometer, and air condenser at 200–240° C. for 6½ hours. 137 parts of monoallyl phthalate are now added and heating continued at 220–240° C. A hard, brittle, light-colored resin is obtained which possesses an acid number 27.7 and a ring and ball softening point of 92° C. The proportions of reactants used in making this ester composition are approximately 1 mole of pentaerythritol with 3⅓ moles rosin and ⅔ mole monoallyl phthalate.

A. 127.5 parts of the above resin and 22.5 parts of monomeric styrene are heated together in a 3-neck flask equipped with a stirrer, thermometer, and water-cooled condenser to 200° C. The temperature is increased to 250° C. over a period of 7 hours. All condensation of monomeric styrene has ceased. A light-colored, hard resin forms which possesses an acid number 9.2 and a ring and ball softening point of 107° C.

B. 120 parts of the resin of Example 2 and 20 parts of diallyl maleate are heated together in a 3-neck flask equipped with a stirrer, thermometer, and air condenser to 200° C. The temperature is increased to 250° C. over a period of 8 hours. A light-colored, hard resin is produced which possesses an acid number of 14.5 and a ring and ball softening point of 112° C.

C. 135 parts of the resin of Example 2 and 15 parts of diethylene glycol ester of monoallyl maleate are heated together in a 3-neck flask equipped with a stirrer, thermometer, and air condenser to 200° C. The temperature is increased to 250° C. over a period of 4 hours. All condensation of monomeric allyl ester had ceased. A light-colored, hard, brittle resin is obtained which possesses an acid number of 10 and a ring and ball softening point of 114° C.

30 parts of the above resin and 60 parts of bodied linseed oil are heated together rapidly to 300° C. Heating is continued at 290–300° C. for 25 minutes. A light-colored varnish base is secured, which could be drawn into a string 18″–24″ in length. It is thinned with 90 parts of VM and P naphtha and 0.6% lead as lead naphthenate and 0.06% cobalt as cobalt naphthenate added upon the oil. The resulting varnish air dried to a tack-free film in 4¾ hours, and after air drying for 24 hours possessed a Sward rocker hardness of 45.

Example 3.—100 parts of kauri having an acid number of 62, 20 parts of WW rosin and 11.3 parts of glycerol are heated together at 200–240° C. in a 3-neck flask equipped with a thermometer, stirrer, and outlet tube leading to a water-cooled condenser. A hydroxyl-containing ester is obtained having an acid number of 12. 20 parts of monoallyl maleate are added and heating continued at 200–220° C. for an additional 4 hours. A hard brittle resin is formed which possesses an acid number of 17 and a ring and ball softening point of 117° C. The softening point is raised when the natural resin ester is heated with styrene as in Example 2–A.

Having thus set forth my invention, I claim:

1. A resinous composition comprising the copolymerization product at between 150° C. and 250° C. of a polymerizable compound containing a

group, and an unsaturated natural resin acid ester of the general formula

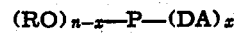

where R is the acyl radical of an unsaturated natural resin acid, P is the residue of a polyhydric alcohol $P(OH)_n$ in which $n$ is an integer greater than one, D is a dicarboxylic acyl radical one carboxylic group of which is esterified by A, A is a 2-alkenyl group of 3 to 4 carbon atoms, and $x$ is a positive number less than $n$, the amount of polymerizable compound containing a

group being from 5% to 60% of said ester.

2. A resinous composition comprising the copolymerization product at between 150° C. and 250° C. of a polymerizable compound containing a

group, and an ester composition comprising a polyhydric alcohol esterified with rosin and a dicarboxylic acid monoester of a beta-olefinic monohydric alcohol of 3 to 4 carbon atoms, the amount of rosin and dicarboxylic acid monoester being sufficient to react with all the hydroxyl groups of the polyhydric alcohol, the amount of polymerizable compound containing a

group being from 5% to 60% of said ester.

3. A resinous composition comprising the copolymerization product at between 150° C. and 250° C. of a polymerizable compound containing a

group, and an ester composition comprising glycerol esterified with sufficient rosin and a dicarboxylic acid monoester of a beta olefinic monohydric alcohol containing from 3 to 4 carbon atoms to react with all the hydroxyl groups of the glycerol, the amount of polymerizable compound containing a

group being from 5% to 60% of said ester.

4. A resinous composition comprising the copolymerization product at between 150° C. and 250° C. of a polymerizable compound containing a

group, and an ester composition comprising pentaerythritol esterified with sufficient rosin and a dicarboxylic acid monoester of a beta olefinic monohydric alcohol containing from 3 to 4 carbon atoms to react with all the hydroxyl groups of the pentaerythritol, the amount of polymerizable compound containing a

group being from 5% to 60% of said ester.

5. A resinous composition comprising the copolymerization product at between 150° C. and 250° C. of a polymerizable compound containing a

group, and an ester composition obtained by reacting substantially 2 moles of glycerol with 5 moles of rosin and 1 mole of monoallyl maleate, the amount of polymerizable compound containing a

group being from 5% to 60% of said ester.

6. A resinous composition comprising the copolymerization product at between 150° C. and 250° C. of a polymerizable compound containing a

group, and an ester composition obtained by reacting substantially 1 mole of pentaerythritol with 3⅓ moles of rosin and ⅔ moles of monoallyl phthalate, the amount of polymerizable compound containing a

group being from 5% to 60% of said ester.

7. The resinous composition of claim 1 wherein the polymerizable compound containing a

group is styrene.

8. The resinous composition of claim 1 wherein the polymerizable compound containing a

group of diallyl maleate.

9. The resinous composition of claim 1 wherein the polymerizable compound containing a

group is vinyl acetate.

10. A composition as set forth in claim 1 in which the dicarboxylic acid is saturated.

11. A composition as set forth in claim 1 in which the dicarboxylic acid is an alpha-unsaturated alpha beta dicarboxylic acid.

12. The process of making a resinous composition which comprises heating at between 150° and 250° C. a mixture of a polymerizable compound containing a

group and an unsaturated natural resin acid ester reaction product of an unsaturated natural resin acid-polyhydric alcohol ester and an alcohol monoester of dicarboxylic acid, the alcohol being a monohydric beta-olefinic alcohol of 3 to 4 carbon atoms, all hydroxyl groups being esterified, the polymerizable compound being from 5% to 60% of said unsaturated natural resin acid ester reaction product.

13. A process as set forth in claim 12 in which the dicarboxylic acid is saturated.

14. A process as set forth in claim 12 in which the dicarboxylic acid is an alpha-unsaturated alpha beta dicarboxylic acid.

JOHN B. RUST.

REFERENCES CITED

The following references are of record in the file of this patent:

UNITED STATES PATENTS

| Number | Name | Date |
|---|---|---|
| 2,195,362 | Ellis | Mar. 26, 1940 |
| 2,280,242 | Kropa | Apr. 21, 1942 |